Feb. 16, 1937. S. D. COOPER Re. 20,264

APPARATUS FOR HANDLING BENT METAL

Original Filed March 1, 1930 4 Sheets-Sheet 1

Inventor
SHELDON DILL COOPER
BY Richey & Watts
Attorneys

Feb. 16, 1937. S. D. COOPER Re. 20,264
APPARATUS FOR HANDLING BENT METAL
Original Filed March 1, 1930 4 Sheets-Sheet 2
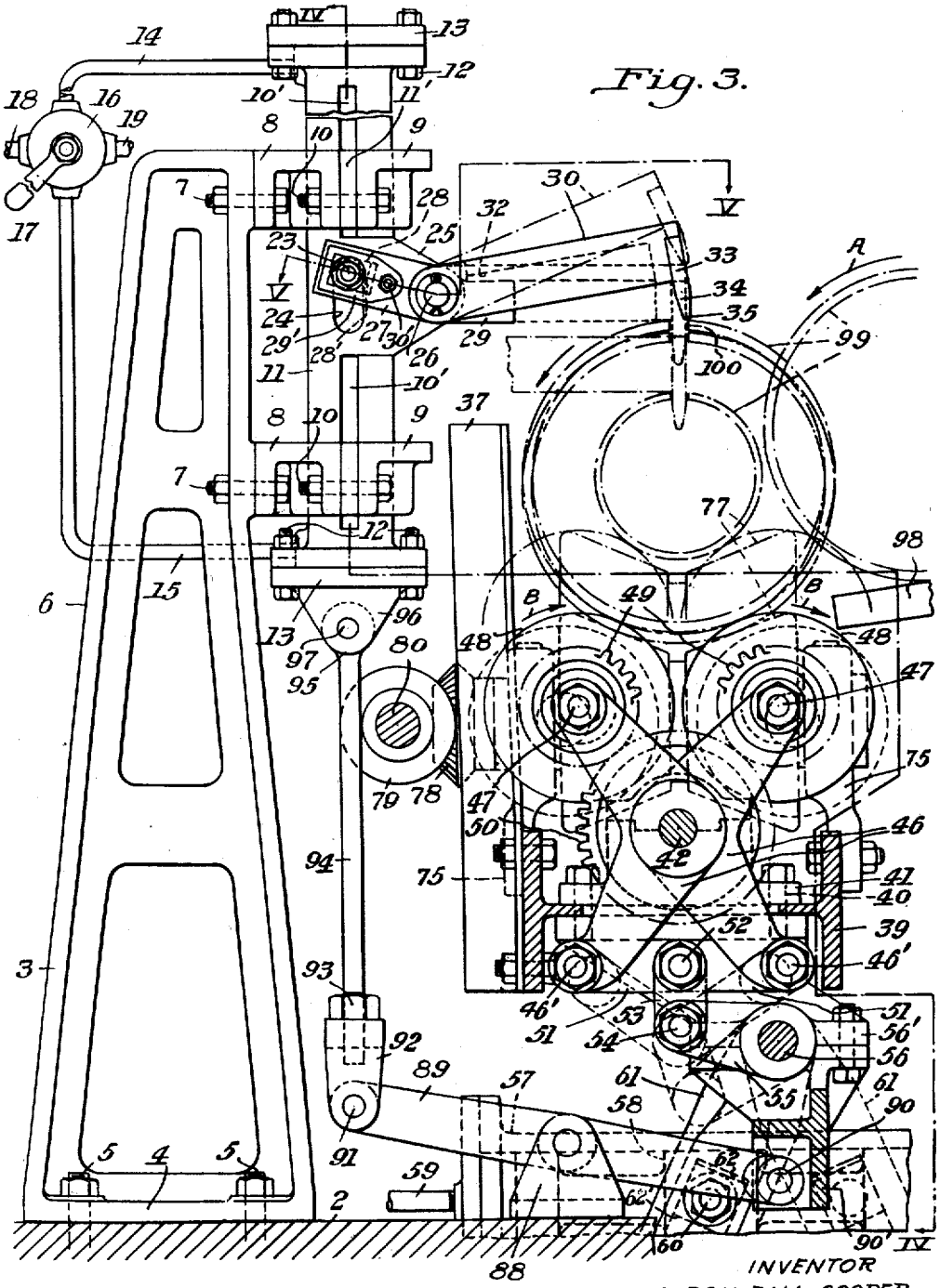
INVENTOR
SHELDON DILL COOPER
BY Ridley & Watts
ATTORNEYS APPARATUS FOR HANDLING BENT METAL
Original Filed March 1, 1930 4 Sheets-Sheet 3
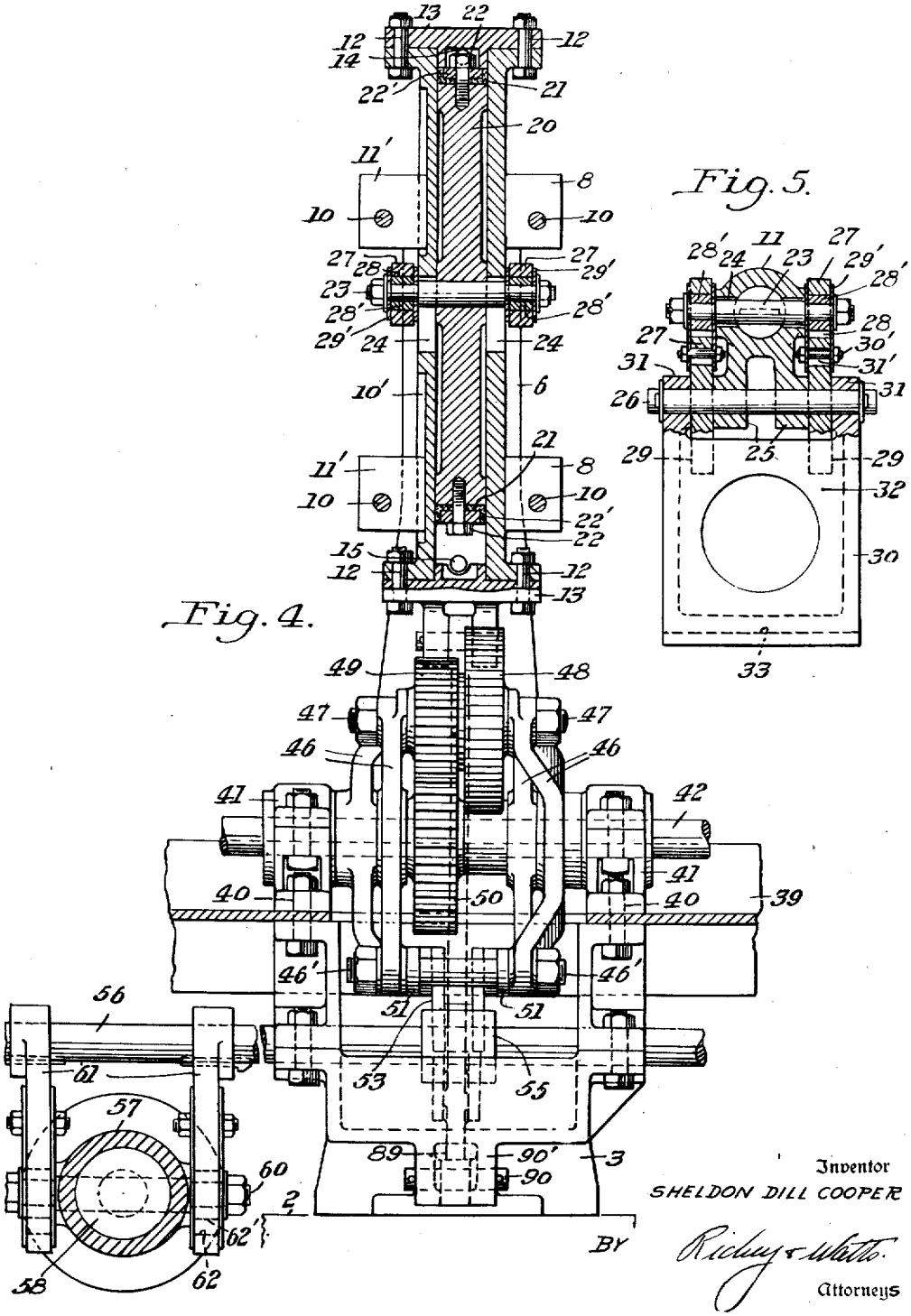
Inventor
SHELDON DILL COOPER
BY Ridley & Watts
Attorneys Feb. 16, 1937. S. D. COOPER Re. 20,264

APPARATUS FOR HANDLING BENT METAL

Original Filed March 1, 1930 4 Sheets-Sheet 4

Inventor
SHELDON DILL COOPER

BY Richey & Watts.
Attorneys

Reissued Feb. 16, 1937

Re. 20,264

UNITED STATES PATENT OFFICE 20,264

APPARATUS FOR HANDLING BENT METAL

Sheldon Dill Cooper, Youngstown, Ohio, assignor to Republic Steel Corporation, Youngstown, Ohio, a corporation of New Jersey Original No. 1,919,186, dated July 25, 1933, Serial No. 432,509, March 1, 1930. Application for reissue July 24, 1935, Serial No. 32,975

31 Claims. (Cl. 29—33)

This invention relates broadly to an apparatus for handling bent metal, and more particularly to an apparatus for handling and predeterminedly positioning and moving bent metal having separated edges forming a cleft.

The invention is particularly useful in pipe mills in which metal sheets or plates are bent into generally tubular form, but with their edges slightly separated preparatory to delivery to suitable welding means for joining the opposed edges to form a completed pipe. The invention aims to predeterminedly handle bent metal having separated edges forming a cleft so as to position the cleft as desired and advance or translate the metal while maintaining the cleft in such desired position.

The device of the present invention may conveniently be used as a unit in a pipe mill disposed intermediate the forming or bending means and the joining or welding means. When so used it would preferably be so positioned with respect to the welding means as to deliver bent metal thereto in the desired line and with the cleft in the desired relative position, generally uppermost.

While the present invention cooperates in a novel manner with other devices used in the manufacture of pipe and described and claimed in copending applications assigned to applicant's assignee, the method and apparatus herein described and claimed involve in themselves certain novel features.

I provide apparatus for handling bent metal having separated edges forming a cleft, comprising means cooperating with the metal at the cleft to predeterminedly position the cleft, and means for moving the metal while maintaining the cleft in the predetermined position.

I further provide a method of handling bent metal having separated edges forming a cleft, comprising positioning the metal with the cleft in a predetermined position, engaging the metal at the cleft to maintain the cleft in such predetermined position, and translating the metal while still maintaining the cleft in such predetermined position.

Other objects and advantages of the invention will become apparent as the following description of a present preferred embodiment thereof proceeds.

In the accompanying drawings I have shown a present preferred embodiment of the invention, wherein Figure 1 is a plan view of metal handling apparatus;

Figure 3 is an enlarged cross section taken on the line III—III of Figure 1;

Figure 4 is a cross section taken on the line IV—IV of Figure 3;

Figure 5 is a cross section taken on the line V—V of Figure 3;

Figure 1:
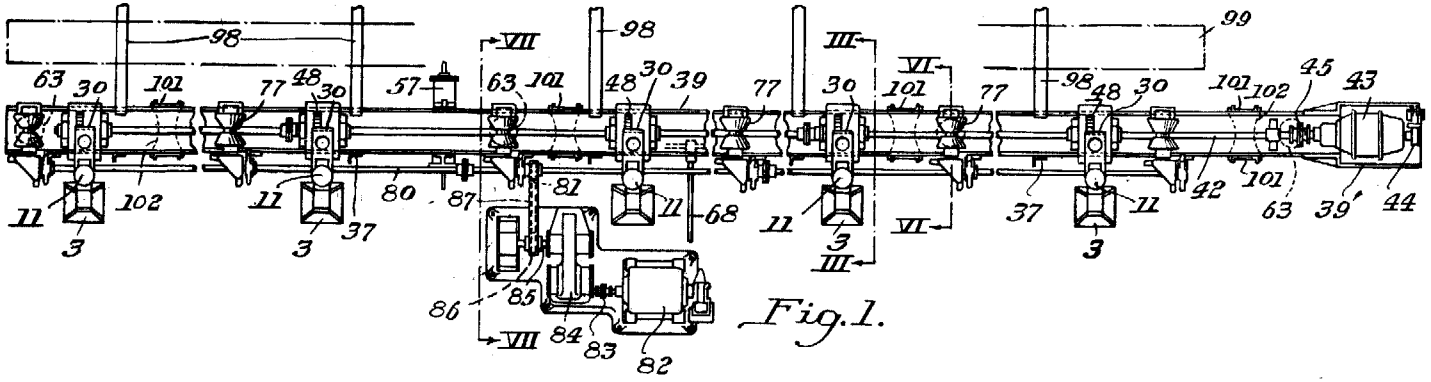
Figure 2:
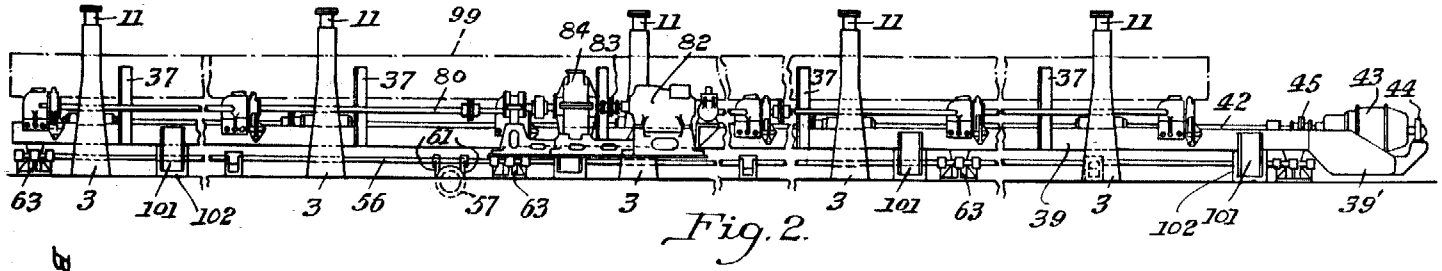
Figure 2 is an elevational view of the apparatus shown in Figure 1.

Referring more particularly to the drawings, reference numeral 2 designates generally a suitable base or support such as a mill floor to which is rigidly connected a number of generally upright aligned standards 3. Each standard 3 comprises a base portion 4 adapted for connection through bolts 5 with the floor 2 and an upper generally vertical portion 6 to which is connected through bolts 7 a pair of spaced brackets 8. Cooperating with each bracket 8 is a complementary bracket 9 connected therewith by bolts 10. Mounted in the brackets 8 and 9 and adapted to slide vertically therein is a cylinder 11. The cylinder is provided externally with a vertical slot 10', and a key 11' held between each pair of brackets 8 and 9 extends within the slot, to prevent turning of the cylinder and insure upward and downward translation thereof within the brackets 8 and 9, as will be described.

Connected with each end of the cylinder 11 by means of bolts 12 is a head 13. Also connected with each end of the cylinder is one of a pair of pipes 14 and 15. The pipe 14 is connected with the top of the cylinder in communication with the interior thereof, and the pipe 15 is connected in like manner with the bottom of the cylinder. The pipes 14 and 15 are connected with a valve 16 having a control handle 17 by means of which fluid pressure from a source 18 may selectively be delivered to the pipes 14 and 15. An exhaust pipe 19 is provided for relieving the pressure in either of the pipes 14 and 15 as desired. The valve 16 is preferably of the type effective in one position for connecting the source of pressure with one of the pipes 14 and 15 and the exhaust pipe with the other, and effective in its other position for connecting the second mentioned one of the pipes 14 and 15 with the source of pressure and the first mentioned one with the exhaust pipe. Thus, at any given time one of the pipes 14 and 15 is connected with the source of pressure and the other with the exhaust pipe.

Fitted within the cylinder 11 is a piston 20 having suitable packing 21 connected with each end thereof by means of a bolt 22 and block 22'. The piston 20 is adapted to move up and down within the cylinder 11 in response to operation of the control valve 16. Passing through the piston 20 is a pin 23, the extremities of which project laterally through suitable slots 24 in the cylinder 11.

Connected with the cylinder 11 is a boss 25 through which passes a pin 26. Mounted for rotation upon the pin 26 is a pair of arms 27. Each of such arms 27 is provided adjacent its left hand extremity, viewing Figure 3, with a longitudinal slot 28 containing a slide bearing 28' adapted to embrace one of the extremities of the pin 23 which passes through the piston 20. Dirt guards 29' connected by bolts 30' are provided for covering the slots 28. The dirt guards 29' are pivoted to the pin 23, the bolts 30' being free to move in slots 31' in the arms 27. Each of such arms 27 is provided at its opposite extremity with an extension or stop 29 for a purpose to be presently described.

By reason of the pin and slot connection between each of the arms 27 and the piston 20, movement of such piston within the cylinder 11 causes pivotal movement of the arms 27 about the axis of the pin 26. When the piston 20 is in a downward position, the stops 29 of the respective arms 27 are in a generally upward position and vice versa.

There is provided a yoke member 30 having opposite bearing extensions 31 journalled on the extremities of the pin 26. The member 30 is provided with an abutment portion 32 adapted normally to rest upon the respective stops 29 of the arms 27. The member 30 is free to pivot about the pin 26 and normally tends through the action of gravity to rotate in a clockwise direction thereabout, viewing Figure 3. Such clockwise rotation, however, is limited by the stops 29 upon contact therewith of the abutment portion 32 of the member 30. Upon downward movement of the piston 20 within the cylinder 11 the stops 29 cooperate with the abutment portion 32 of the member 30 to cause such member to rotate about the pivot of the pin 26 in a counter-clockwise direction, viewing Figure 3, the member 30, however, being free for clockwise rotation or downward movement upon upward movement of the piston, which lowers the stops 29.

The member 30 is provided at its outer extremity with a generally downwardly extending finger 33 having a tapered lower extremity 34 terminating in a generally rounded point 35 for a purpose to be presently described.

There is provided a longitudinally disposed I-beam 39 which extends substantially the entire length of the apparatus and has its web disposed generally horizontally. Such I-beam serves as a frame for the apparatus as a whole, as will be presently described. Bolted to the I-beam 39 at intervals by means of bolts 40 are bearings 41 which cooperate to support for rotation a longitudinally extending shaft 42. The disposition of the I-beam 39 is such that the shaft 42, which also extends substantially the entire length of the apparatus, is adjacent and substantially parallel to the line of standards 3. One extremity of the I-beam 39 is provided with an enlarged support 39' on which is mounted a motor 43 operatively connected with the shaft 42 for driving the same through a flexible coupling 45. A magnetic brake 44 is provided for the motor 43.

Mounted on the shaft 42 at intervals are a number of pairs of concentric toggle levers 46. To the upper arm of each of such toggle levers is connected a pin 47 on which is journalled for rotation a roll 48 with which is connected a driving gear 49. Keyed to the shaft 42 and meshing with each set of driving gears 49 is a gear 50 adapted upon rotation of the shaft 42 to operate the gears 49 and consequently to rotate the rolls 48. Due to the fact that the distance between the center of the shaft 42 and the centers of the respective pins 47 always remains the same regardless of the position of the toggle levers, the meshing of the respective gears 49 with their corresponding gears 50 is not affected by the position of the toggle levers and rolls 48. Whenever the shaft 42 is rotated by the motor 43, the rolls 48 are correspondingly rotated regardless of the position of the toggle levers 46.

Pivoted to the lower extremity of each toggle lever 46 at 46' is a link 51. With respect to each set of toggle levers, the two links 51 are pivoted together at 52. Also pivoted at 52 is a link 53, the opposite extremity of which is pivoted at 54 to an arm 55 keyed to a shaft 56 journalled in spaced bearings 56' connected with the I-beam 39. Rotation of the shaft 56 in the counter-clockwise direction, viewing Figure 3, pulls the link 53 downwardly, which, in turn, through the links 51, draws the lower ends of the respective toggle levers 46 toward each other, thus bodily moving the respective rolls 48 outwardly and downwardly for a purpose to be presently described.

There is provided a cylinder 57 within which fits a piston 58 adapted to be reciprocated through suitable fluid connections 59. Passing through the piston 58 and through the walls of the cylinder 57 is a pin 60. Keyed to the shaft 56 is a pair of crank arms 61 each having a slot 62 containing a slide bearing 62' containing an extremity of the pin 60 so that upon reciprocation of the piston 58 within the cylinder 57 the shaft 56 is rotated through a small angle whereby to effect the desired operation of the toggles, and hence of the rolls 48, without disturbing the driving connections to the rolls through the gears 50 and 49, respectively.

Mounted on the floor 2 is a series of standards 63 in each of which is journalled a vertically disposed screw 64 to which is keyed a worm wheel 65. There is provided a longitudinally extending shaft 66 journalled in bearings 66' carried by the standards 63. Keyed to the shaft 66 is a series of worms 67, each adapted to cooperate with one of the worm wheels 65 to rotate its screw 64. An arm 68 is provided for operating the shaft 66.

Cooperating with each screw 64 is a nut 69 having a collar 70 to which is connected an annular supporting member 71. The I-beam 39 is connected with the respective annular supporting members 71 through bolts 72 cooperating with fastening plates, 73. The web of the I-beam is provided with apertures spaced to receive hubs 73' on the upper extremities of the respective members 71. Thus the I-beam 39 is supported for adjusted vertical movement by means of the respective screws 64, controlled by the shaft 66 through the arm 68, as will be presently described.

Connected with the I-beam 39 at intervals by means of bolts 74 are bearing members 75. In each pair of bearing members 75 is journalled for rotation a shaft 76 carrying a hollowed roll 77. The rolls 77 are disposed with relation to the rolls 48 as shown in Figure 3 for a purpose to be presently described. To one extremity of each shaft 76 is keyed a bevel gear 78 meshing with one of a series of bevel gears 79 keyed to a longitudinally extending shaft 80 provided with a sprocket 81 and journalled in a housing 81' carried by the I-beam 39. There is provided a motor 82 connected by a flexible coupling 83 with reduction gearing 84 with which is connected a shaft 85 carrying a sprocket 86. A sprocket chain 87 connects the sprockets 81 and 86 and provides for the driving of the former by the latter.

By means of the screws 64 the I-beam 39 and everything carried thereby may be raised and lowered as desired. The sprocket chain connection between the sprocket 86 and the sprocket 81 keyed to the shaft 80 is such that the motor 82 is effective for rotating the shaft 80 regardless of the elevation of the latter. The two shafts 80 and 85 are at substantially the same elevation and substantially separated and a slight change in elevation of the shaft 80 does not substantially affect the operation of the sprocket drive.

Mounted on the floor 2 is a series of fulcrum standards 88, one corresponding to each standard 3. Pivoted to each such fulcrum standard 88 is a lever 89 having substantially equal arms on opposite sides of the pivot. The lever is pivoted at one extremity at 90 to a bracket 90' connected with the I-beam 39 and at the other extremity at 91 to a collar 92 into which is threaded a rod 94 having at its upper extremity a bearing 95. A jam nut 93 is provided for maintaining the collar 92 in the desired position on the rod 94. Connected with the lower head 13 of the cylinder 11 is a lug 96 through which the bearing 95 passes a pin 97. By these means the cylinder 11 is connected with the I-beam 39 and, by reason of the fact that the arms of the lever 89 are equal, any downward movement of the I-beam produces an equal upward movement of the cylinder 11, and vice versa. The cylinder 11 is adapted to slide within the brackets 8 and 9.

There is provided a series of skids 98 extending generally downwardly at an angle toward the upper surfaces of the rolls 48, as shown in Figure 3. Such skids are adapted to deliver to the apparatus a length of bent metal 99 having a cleft 100, as will be presently described. Connected with the I-beam 39 through bolts 38 opposite each skid 98 is an upwardly projecting guard post in the shape of an angle iron 37, whose function is to prevent lengths of bent metal delivered by the skids 98 from passing across the rolls 48, as will be presently described.

Connected at opposite points to the I-beam 39 at intervals is a series of vertical guides 101 cooperating with corresponding guiding standards 102 mounted on the floor 2. The standards 102 have outwardly extending portions 103 embracing the vertical guides 101 connected to the I-beam, so that the I-beam is positively guided and free for vertical movement by the screws 64.

The method contemplated according to the present invention is adapted to be carried out upon the apparatus above described, as well as upon other apparatus suitable for the purpose. The operation of the described apparatus will now be explained, the same also serving to make clear the method above referred to.

Figure 6:
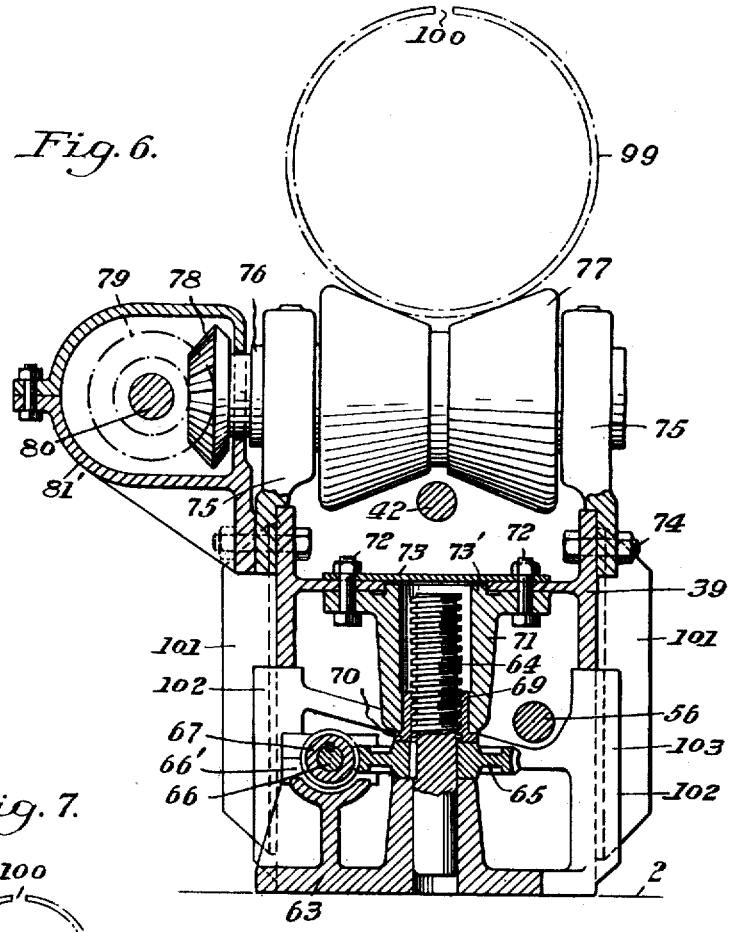
Figure 6 is an enlarged cross section taken on the line VI—VI of Figure 1.
Figure 7:
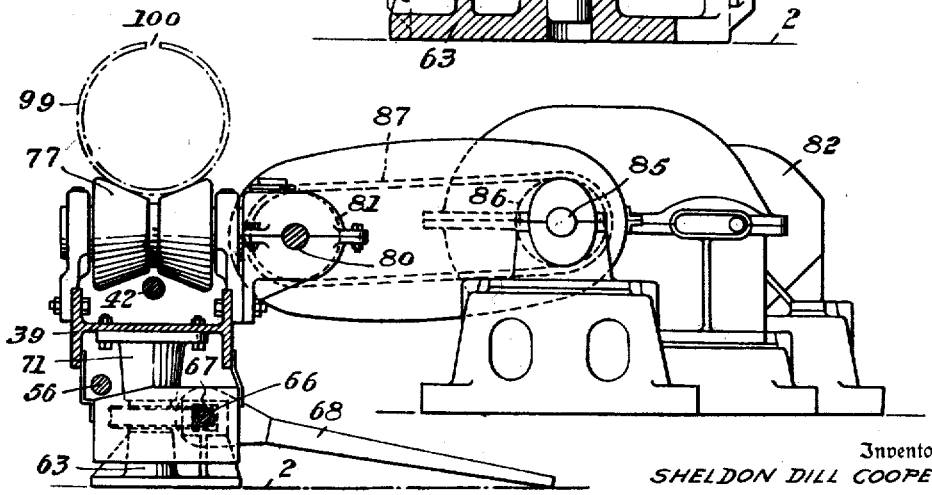
Figure 7 is an enlarged cross section taken on the line VII—VII of Figure 1.

A piece of bent metal such, for example, as that well shown in Figures 6 and 7, and having its edges separated to form a cleft 100 is rolled down the skids 98 onto the rolls 48. In their normal position the metal supporting surfaces of the rolls 48 are at an elevation above the metal supporting surfaces of the rolls 77 and consequently when the length 99 of bent metal is delivered from the skids 98, it is supported solely by the rolls 48 and does not come in contact with the rolls 77.

The direction in which the length of bent metal 99 rotates as it rolls down the skids 98 is designated by the arrow A in Figure 3. If desired, the rolls 48 may be rotating through the action of the motor 43 in the direction of the arrows B in Figure 3 at the time the length of metal 99 is delivered to them. If so desired, the length of metal after it has settled upon the rolls 48 substantially continues its rotation in the direction of the arrow A, although remaining in a predetermined position upon the rolls while rotating. The guard 37 prevents the length of metal from rolling over the rolls 48 and passing out of contact with them.

If desired, the rolls 48 may remain stationary until after the length of metal 99 has settled thereon. However, regardless of whether or not the rolls 48 are rotating at the time the bent metal is delivered to them, they will be rotated, either in the direction of the arrows B of Figure 3 or in the opposite direction, immediately after delivery of the metal, thereby causing the metal to turn substantially about its axis. At the time the metal is delivered to the rolls 48, the position of the cleft 100 is uncertain. Such cleft may be near the top of the metal or it may be near the bottom or at either side.

As soon as the length of metal 99 has settled upon the rolls 48 and such rolls are rotated as above explained, the member 30 being normally held upwardly, the valve 16 is operated to admit fluid to the pipe 15, thereby moving the piston 20 upwardly and permitting the member 30 to rotate about the axis of the pin 26 in the clockwise direction, viewing Figure 3, until the point 35 of the finger 33 rests upon the outer surface of the length of metal 99. Due to the fact that the piston 20 has been raised, the member 30 rests freely upon the length of metal and may move further downwardly when the opportunity is presented.

Rotation of the rolls 48, causing rotation of the length of metal 99 substantially about its axis, eventually brings the cleft 100 toward the top, and when it reaches the uppermost position the finger 33 drops into the cleft, thereby preventing further rotation of the length of metal in spite of rotation of the rolls 48, substantially retaining or holding the length of metal in the desired position with the cleft uppermost.

After the cleft of the metal has been positioned as above explained, the piston 58 in the cylinder 57 is moved toward the right, viewing Figure 3, thereby rotating the shaft 56 in the counter-clockwise direction and opening the upper extremities of the toggles 46, whereby the respective rolls 48 move outwardly with respect to each other and downwardly as above described. This outward and downward movement of the rolls 48 brings them to inoperative position so far as the length of metal 99 is concerned, in that they pass out of contact with such length of metal, the latter being automatically delivered to the rolls 77, the metal supporting surfaces of which normally lie only slightly below the metal supporting surfaces of the rolls 48. Thus, the rolls 48 become inoperative, and either before or after delivery of the length of metal to the rolls 77, the motor 43 may be stopped, as further rotation of the shaft 42 will have no further effect on the length of metal and is consequently unnecessary.

Upon delivery of the length of metal from the rolls 48 to the rolls 77, the metal moves downwardly very slightly, probably not more than an inch or two at the most. The member 30 pivots slightly downwardly with the length of metal, so that in spite of such slight downward movement of the metal, the fingers 33 still remain within the cleft 100 and in engagement with the length of metal, whereby to still retain it in the desired position with the cleft uppermost.

After delivery of the metal to the rolls 77, the motor 82 is started and the rolls 77 rotated, whereby to cause endwise displacement of the length of metal substantially in the direction of its axis. The length of metal is thus translated while its cleft is maintained in the desired predetermined position by means of the fingers 35, which slide along the cleft as the metal moves over the rolls 77.

It will be understood that after one blank has been discharged by rolls 77 from the device and before another pipe blank can be received, parts of the device may be reset. The fingers 33 can be elevated, as is readily accomplished by reversing the flow of fluid in lines 14 and 15 and thereby moving cylinder 20 downwardly to lift the fingers out of the path of the next pipe blank, or the blank in rolling onto the table may automatically lift the fingers without damage to them due to the shape of the fingers and their loose pivoting on pins 26. The rolls 48 may be raised before or after the next pipe blank has been delivered by skids 98. This operation is accomplished by movement of piston 58 to the left, viewing Fig. 3, by means of fluid connections 59, thereby rotating shaft 56 slightly clockwise and pivoting levers 46 to bring rolls 48 closer together and to a position with their top surfaces above the top surfaces of rolls 77. If rolls 48 are raised after the blank has been delivered to rolls 77, the rolls 48 lift the blank from rolls 77 whereupon it may be rotated to position the seam, as above described. If the oncoming blank is to be delivered from skids 98 to rolls 77, rotation of the latter should be stopped before the blank engages with rolls 77, altho they may be rotated to position the blank on the roll table in any position desired along the table before rolls 48 lift and rotate the blank.

When the device is used for delivering bent metal to a welding machine, it is, of course, essential that the metal enter the welder substantially exactly along a predetermined line. Consequently the elevation of the rolls must be susceptible of adjustment so as to insure proper feeding to the welder. The device is adapted for handling bent metal of widely varying sizes. In order to provide for properly feeding the bent metal to the welder regardless of the particular size being handled, provision is made for insuring forward displacement of the metal with its axis substantially in a predetermined line regardless of the diameter of the bent metal.

By means of the lever connection 89 between the cylinder 11 and the supporting structure for the rolls, the member 30 and the rolls are always adapted to properly cooperate with the metal to insure advancing it in the desired line, as the elevation of the rolls may be adjusted at will to suit the particular size of the metal being handled, and the member 30 automatically assumes its proper position to permit the finger 33 to enter the cleft. For the larger sizes the cylinder 11 is moved upwardly and the roll supporting structure is moved downwardly, but the upward displacement of the former is exactly equal to the downward displacement of the latter, which provides for accomplishing the result sought.

As above described, the shaft 66 carrying the respective worms 67 extends the entire length of the apparatus so that rotation of such shaft by means of the arm 68 causes equal upward or downward movement of all parts of the I-beam 39 and consequently of all of the stands of rolls. Such movement of the rolls is accompanied by a corresponding oppositely directed movement of the cylinder 11, the same sliding vertically within the brackets 8 and 9.

Figure 8:
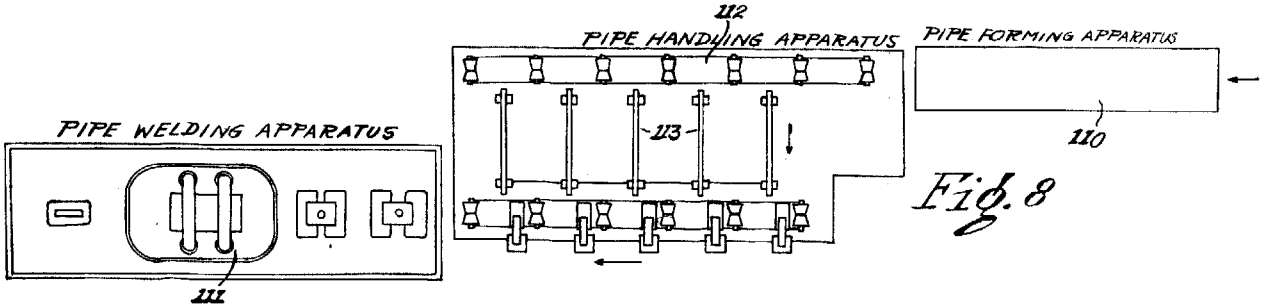
Figure 8 is a diagrammatic drawing illustrating the metal handling apparatus of Figure 1 positioned in operative relation with pipe forming and pipe welding apparatus.

In Figure 8 there is illustrated the metal handling apparatus of Figure 1 operatively positioned between pipe forming apparatus 110 and pipe welding apparatus 111. The blank A enters one end of the pipe forming apparatus 110 as an elongated flat strip of metal and is discharged therefrom onto the rolls of the run-out table 112 in the form of a tubular blank having an open seam cleft 100. The blank is moved transversely on the conveyor table 113 and is deposited on the metal handling apparatus which, as above described, rotates the blank to position the seam cleft properly for welding, and then moves the blank endwise into the welding apparatus 111 where the spaced edges of the open seam cleft are closed and welded together.

While I have shown and described a present preferred embodiment of the invention, it is to be understood that the same is not limited thereto but may be otherwise variously embodied and practiced within the scope of the following claims.

I claim:—

1. Apparatus for handling bent metal having separated edges forming a cleft, comprising retractable means for initially supporting the metal for axial rotation, means cooperating with the metal at the cleft to predeterminedly position the cleft, and means for supporting the metal for axial movement while maintaining the cleft in the predetermined position.

2. Apparatus for handling bent metal having separated edges forming a cleft, comprising means for rotating the metal, means cooperating with the metal at the cleft to interrupt such rotation with the cleft in predetermined position, and means for translating the metal while maintaining the cleft in the predetermined position, said rotating means being retractable to deposit the metal on said translating means.

3. Apparatus for handling bent metal having separated edges forming a craft, comprising means cooperating with the metal at the cleft to predeterminedly position the cleft, means for translating the metal relatively to such first mentioned means while maintaining the cleft in the predetermined position, and retractable means for supporting the metal for cleft positioning.

4. Apparatus for handling bent metal having separated edges forming a cleft, comprising retractable means for rotating the metal, guide means positioned externally of the metal and adapted to cooperate with the metal at the cleft upon movement of the cleft into cooperative relation therewith to predeterminedly position the cleft and interrupt the rotation of the metal, and means for translating the metal while maintaining the cleft in the predetermined position on retraction of said first-mentioned means.

5. Apparatus for handling bent metal having separated edges forming a cleft, comprising means for rotating the metal, means cooperating with the metal at the cleft to interrupt such rotation with the cleft in predetermined position, means for translating the metal, and means for moving the rotating means out of cooperative relationship with the metal whereby to position the metal in cooperative relationship with the translating means.

6. Apparatus for handling bent metal having separated edges forming a cleft, comprising means for rotating the metal, means for translating the metal adapted to receive the metal upon movement of the rotating means to inoperative position, means for moving the rotating means to inoperative position, and means for predeterminedly positioning the cleft of the metal during translation thereof.

7. Apparatus for handling bent metal having separated edges forming a cleft, comprising metal rotating means and metal translating means disposed in generally parallel generally horizontal planes, means for effecting generally vertical movement of one of said means relative to the other whereby to selectively control the movement of the metal by one or the other of such means, and means for predeterminedly positioning the cleft of the metal during translation thereof.

8. Apparatus for handling bent metal having separated edges forming a cleft, comprising metal supporting and moving means, cleft positioning means disposed in proximity thereto and adapted to cooperate therewith, and means for varying the distance between said respective means whereby to adapt the same to cooperatively act on bent metal of various sizes while substantially predeterminedly locating the center of such bent metal regardless of its size.

9. Apparatus for handling bent metal having separated edges forming a cleft, comprising metal supporting and moving means, cleft positioning means disposed in proximity thereto and adapted to cooperate therewith, and means connected with both of such means for moving the same substantially equal distances toward and away from each other.

10. Apparatus for handling bent metal having separated edges forming a cleft, comprising metal supporting and translating means, cleft positioning means adjacent thereto adapted to cooperate therewith whereby the metal can be translated while the cleft is maintained in a predetermined position, and retractable means for supporting the metal for cleft positioning.

11. Apparatus for handling bent metal having separated edges forming a cleft, comprising metal supporting and translating means, and pivoted means having a finger adapted to enter the cleft in the metal, the supporting and translating means being adapted to translate the metal relatively to the pivoted means while maintaining the cleft in predetermined position.

12. Apparatus for handling bent metal having separated edges forming a cleft, comprising metal rotating rolls, metal translating rolls, the rotating rolls being adapted to swing to inoperative position to deliver the metal to the translating rolls, and cleft positioning means for predeterminedly positioning the cleft of the metal during translation thereof.

13. Apparatus for handling bent metal having separated edges forming a cleft, comprising pivotally mounted metal rotating rolls, driving means therefor rotatable about the axis of such pivot, metal translating means, the metal rotating rolls being swingable about such pivot to transfer the metal to the metal translating means, and cleft positioning means for predeterminedly positioning the cleft of the metal during translation thereof.

14. Apparatus for handling bent metal having separated edges forming a cleft, comprising concentrically pivoted toggles, a pair of metal rotating rolls carried thereby, driving means for the rolls rotatable about such pivot, means for operating the toggles to separate the rolls, metal translating means disposed to receive the metal from the metal rotating rolls upon separation thereof, and cleft positioning means for predeterminedly positioning the cleft of the metal during translation thereof.

15. Apparatus for handling bent metal having separated edges forming a cleft, comprising metal rotating means, metal translating means, movable cleft positioning means adapted to engage the metal at the cleft to predeterminedly position the cleft while the metal is in operative relation to the metal rotating means and the metal translating means, and means to transfer the metal between the metal rotating means and the metal translating means.

16. Apparatus for handling bent metal having separated edges forming a cleft, comprising metal rotating means, metal translating means, cleft positioning means mounted adjacent the metal rotating means and metal translating means, the cleft positioning means on the one hand and the metal rotating means and metal translating means together on the other hand being relatively bodily movable to adapt the same to operate upon metal of various sizes while maintaining the center line of the metal at substantially a predetermined position.

17. Apparatus for handling plates bent to cylindrical form and having an open axial seam cleft, comprising rolls for rotating the plates, rolls for shifting the plates longitudinally, means for moving one set of rolls relative to another, means for moving both sets of rolls simultaneously, and retractable means for entering the seam cleft to hold the plates in a predetermined position after rotation thereof.

18. Apparatus for handling plates bent to cylindrical form and having an open axial seam cleft, comprising rolls journaled on axial shafts for rotating said plates, rolls journaled on shafts transverse to the axis of the bent plates for shifting them longitudinally, means for simultaneously adjusting said rolls and means for moving one set of rolls independently of the other, a guide finger adapted to enter said cleft, means for withdrawing it therefrom, and means for adjusting said withdrawing means by adjusting movement of said rolls.

19. Apparatus for handling plates bent to cylindrical form and having an open axial cleft, comprising shifting rolls for the bent plates, a guide finger for entering the cleft, and means for simultaneously adjusting said rolls and finger for operating on plates of different dimensions.

20. Apparatus for forwarding a formed tube blank to a welder for joining the edges of an axial seam cleft therein, comprising a roll table for supporting and advancing the blank, auxiliary means effective to support the blank above the table for rotation about its own axis, and means for entering said cleft on such rotation to position the blank for movement through the welder.

21. In a tube welding mill, the combination with a welder for closing an axial seam in a formed tube blank, and forming means for making the blank from flat plate, of means between the welder and forming means for rotating a blank about its axis to position the seam cleft, and means for holding the blank in position when rotated thereto.

22. In a tube welding mill, the combination with a welder for closing an axial seam in a formed tube blank, and forming means for making the blank from flat plate, of means between the welder and forming means for rotating a blank about its axis to position the seam cleft.

23. The combination with apparatus for welding together the edges of an axial seam cleft in a formed tube blank, of means for effecting a predetermined positioning of the seam cleft relative to the welder including a roll table for moving the blank axially, auxiliary supports for lifting the blank from the table and rotating it, and retractible means for entering the seam cleft upon its arrival at the predetermined position.

24. The combination with apparatus for welding together the edges of an axial seam cleft in a formed tube blank, means for effecting a predetermined positioning of the seam cleft relative to the welder including a roll table for moving the blank axially, auxiliary supports for supporting and rotating the blank above the table, and means for entering the seam cleft upon its arrival at the predetermined position.

25. The combination with apparatus for welding together the edges of an axial seam cleft in a formed tube blank, of means for effecting a predetermined positioning of the seam cleft relative to the welder including a roll table for moving the blank axially, auxiliary means having longitudinal rolls for engaging the blank, means for positioning the longitudinal rollers above the roll table, means for driving the longitudinal rolls to turn the blank, and means for entering the seam cleft when properly positioned.

26. Apparatus for forwarding a formed tube blank to a welder for joining the edges of an axial seam cleft therein, comprising means for effecting a predetermined positioning of the seam cleft relative to the welder including a roll table for moving the blank axially, auxiliary supports for supporting and rotating the blank above the roll table, and means for entering the seam cleft upon its arrival at the predetermined position.

27. Apparatus for forwarding a formed tube blank to a welder for joining the edges of an axial seam cleft therein, comprising means for effecting a predetermined positioning of the seam cleft relative to the welder including a roll table for moving the blank axially, auxiliary support for supporting and rotating the blank above the roll table, means for entering the seam cleft upon its arrival at the predetermnied position, and means for lowering the blank onto the roll table.

28. Apparatus for effecting a predetermined position of the axial seam cleft of a formed tube blank, including a roll table having rolls for moving the blank axially, a shaft for driving the rolls of said roll table, blank supporting means between the rolls of the table having longitudinal blank engaging rolls for rotating the blank while it is out of contact with the roll table rolls to position the seam cleft, and means for actuating the blank supporting means to move the longitudinal rolls out of contact with the blank and to bring the blank into engagement with the roll table rolls.

29. Apparatus for effecting a predetermined position of the axial seam cleft of a formed tube blank, including a roll table having rolls for moving the blank axially, blank supporting means between the rolls of the table having longitudinal blank engaging rolls, means driving the longitudinal rolls to turn the blank and position the seam cleft while the blank is out of contact with the roll table rolls, and means for actuating the blank supporting means to move the longitudinal rolls out of contact with the blank and to bring the blank into engagement with the roll table rolls.

30. Apparatus for forwarding a formed tube blank to a welder for joining the edges of an axial seam cleft therein, comprising a roll table for supporting and advancing the blank axially, auxiliary means effective to support the blank above the table and rotate the blank about its own axis and to position the seam cleft, and means for actuating the auxiliary means to lower the blank onto the roll table when the seam cleft has been positioned.

31. Apparatus for handling a tube blank having an axial seam cleft including means having longitudinal rolls to engage and rotate a tube blank to bring the seam cleft to a predetermined position, a roll table having rolls to move the tube blank axially with the seam cleft in predetermined position, and means for moving the longitudinal rolls to deposit the tube blank on the roll table rolls after the seam cleft has been positioned.

SHELDON DILL COOPER.

CERTIFICATE OF CORRECTION.

Reissue No. 20,264. February 16, 1937.

SHELDON DILL COOPER.

It is hereby certified that error appears in the printed specification of the above numbered patent requiring correction as follows: Page 4, second column, line 61, claim 3, for "craft" read cleft; and that the said Letters Patent should be read with this correction therein that the same may conform to the record of the case in the Patent Office.

Signed and sealed this 1st day of June, A. D. 1937.

Henry Van Arsdale (Seal) Acting Commissioner of Patents.